Figure 1:
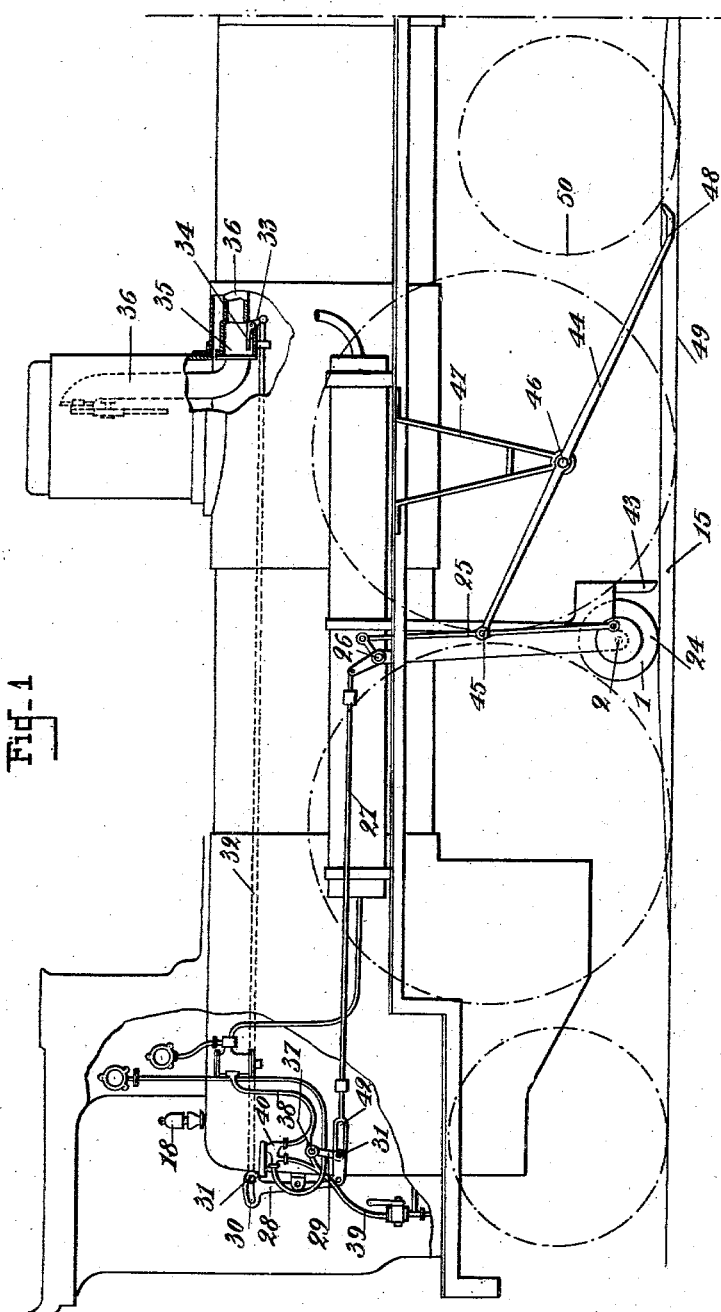

No. 739,808. PATENTED SEPT. 29, 1903.
J. AUGROS.
SAFETY DEVICE FOR TRAINS.
APPLICATION FILED APR. 9, 1903.
NO MODEL. 2 SHEETS—SHEET 1.

WITNESSES
H. M. Kuehnle
John A. Percival

INVENTOR
Joseph Augros
BY
ATTORNEYS

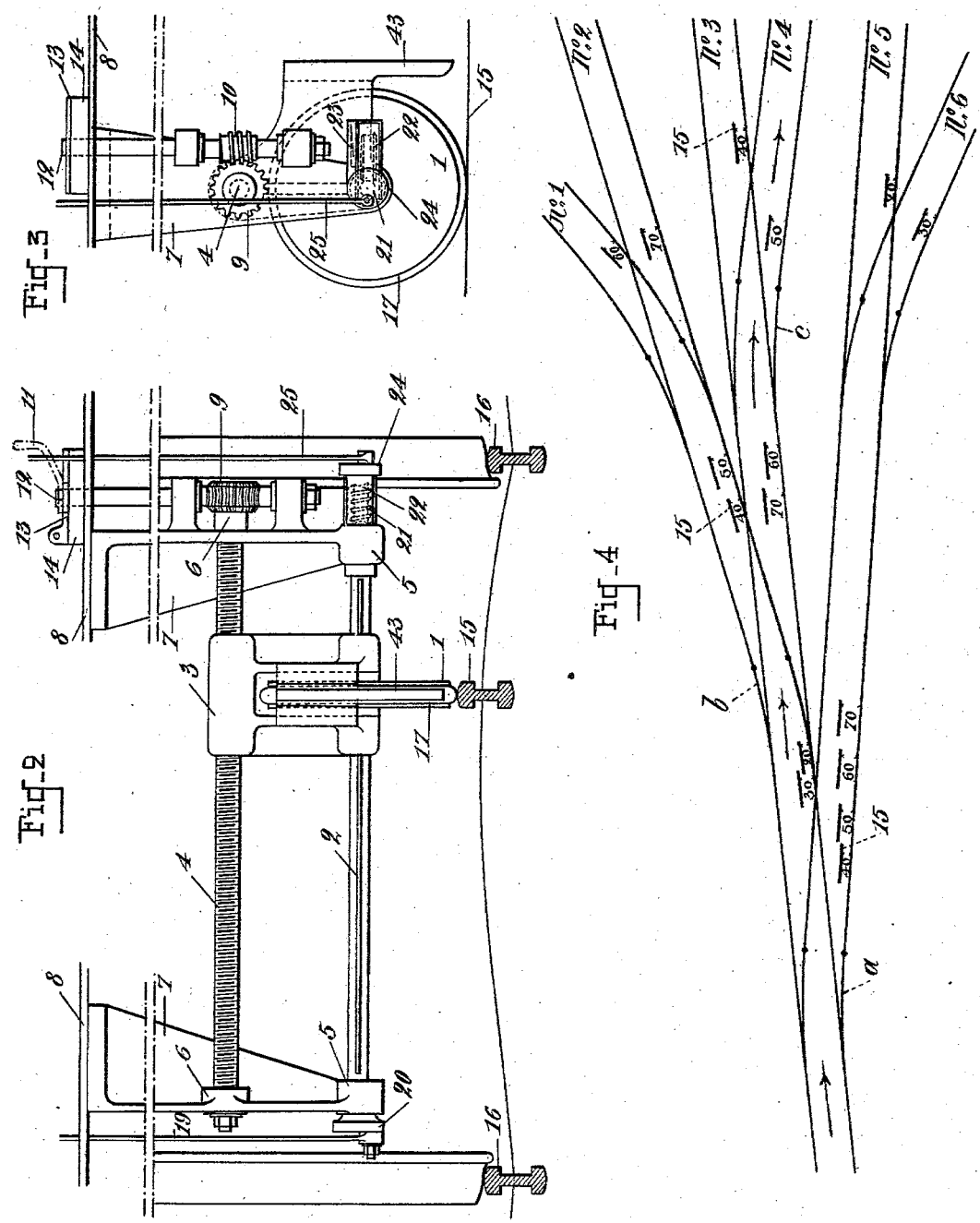

No. 739,808.

Patented September 29, 1903.

UNITED STATES PATENT OFFICE.

JOSEPH AUGROS, OF PARIS, FRANCE.

SAFETY DEVICE FOR TRAINS.

SPECIFICATION forming part of Letters Patent No. 739,808, dated September 29, 1903.

Application filed April 9, 1903. Serial No. 151,877. (No model.)

*To all whom it may concern:*

Be it known that I, JOSEPH AUGROS, a citizen of the French Republic, residing in Paris, France, have invented certain new and useful Improvements in and Connected with Safety Devices for Trains and the Like, (for which I have obtained a patent in France, No. 325,348, bearing date October 23, 1902,) of which the following is a specification.

This invention has for its object a device for warning and indicating errors in switching in railway-tracks and simultaneously automatically stopping the trains. This arrangement consists in the combination of an actuating device brought into action as soon as a train takes a wrong track, together with a suitable system of transmitting mechanism operated by said actuating device and simultaneously bringing into action an alarm-whistle, a valve for applying the brakes, shutting off the supply of steam, and an indicating or controlling apparatus.

The essential feature of this improved arrangement—that is to say, the actuating device—consists in the combination of the following two parts: (a) a motor-wheel adjustably keyed on a shaft capable of being fixed in a given position under the locomotive by means of a regulating-screw; (b) raised counter-rails placed at the points which ought not to be passed by the train and these rails being so arranged as to set the motor-wheel of the actuating device in motion by friction.

The transmitting mechanism which operates the devices in question may be actuated by means of a swinging lever, which produces the same effects as the revolving of the wheel. The said lever operates in the case where the locomotive runs off the rails. It produces then the stopping of this latter and the simultaneous braking of all the cars.

In order to allow of the invention being better understood, it will now be fully described in reference to the annexed drawings, which show by way of example—

Figure 1, the view of apparatus placed on the locomotive; Fig. 2, the longitudinal view of the actuating device; Fig. 3, the front view of the same; Fig. 4, the arrangement of the counter-rails in a branch track of six lines.

The actuating device consists in a wheel 1, keyed on a feathered shaft 2 and movable along said shaft by means of a threaded nut 3, secured to said wheel, which nut may be worked along a fixed screw-threaded shaft 4. The feathered shaft 2 and the screw-threaded shaft 4 are supported by bearings 5 and 6, arranged in brackets 7, fixed under the frame 8 of the locomotive. The wheel 1 is brought in position on the feathered shaft 2 by the rotation of the threaded shaft 4 or spindle, such rotation being obtained by a helicoidal wheel 9, gearing with a worm on a vertical shaft 10, said shaft being provided with a suitable handle 11. This handle is fitted on a square piece 12 at the end of the spindle 10, having the worm and fitting exactly in a square hole in a safety-cover 13, which maintains the wheel in its desired position on the feathered shaft. An indicator 14, placed on the table 8 of the engine, indicates the exact position of the wheel 1 relative to the track. The wheel 1 is thus arranged above the corresponding counter-rails 15, which are placed at the commencement of all the tracks which are to be avoided by a given train, the said counter-rails being fixed slightly higher on the sleepers than the rails 16, (from five to six centimeters.) The friction-wheel 1 also has a piece of rubber 17 on its periphery sufficiently thick to insure a suitable elasticity and compensate for differences of level which may arise between the counter-rail 15 and the wheel 1. The warning apparatus comprises an alarm-whistle 18, placed near the engine-driver and operated by a lever 19, in turn actuated by a rod from an eccentric disk or plate 20, keyed on one end of the shaft 2.

The recording apparatus comprises an endless screw or worm 21, carried on the other end of the feather and gearing with a helicoidal wheel 22, the movements of which are recorded by a pointer 23, movable over a suitably-arranged divided scale.

The apparatus for automatically stopping the train simultaneously both shuts off the steam and opens the compressed-air pipe for operating the brakes. For this purpose the apparatus comprises an eccentric disk 24, keyed on one of the ends of the feathered shaft 2 and actuating a rod 25, which rod is pivoted at its upper end on an elbow-lever 26, fixed on the locomotive and operates a second rod 27, the other end of which is connected with a lever 28 in the cab and with a link 29, having a stud 31 at its end which engages in a slot 42, formed in the end of the second rod 27, above referred to. The lever 28 in the cab has a slot 30, in which a stud 31 on a long rod 32 engages, said rod being pivoted at its other end to a lever 33, carrying a valve 34, adapted to close one of the apertures of a valve-box 35, branched from the steam-supply pipe 36. The link 29 above referred to operates a tap or cock 37, arranged on a branch of the compressed-air pipes 38 39, operating the brakes, and thus not impeding in any way the ordinary operation of these latter by usual tap or cock 40. The rod 25 may be also operated by means of a lever 44, pivoted on a stud 45, fixed to this rod. This latter can swing on a fixed stud 46 of a bracket 47, secured under the locomotive. This lever 44 extends by a curved stop 48, placed nearly against the normal rail 49, behind the wheel 50 and in the upright plan of this latter. Thereby the lever 44 is protected.

When the locomotive runs off the track, the curved end 48 of the lever 44 comes into contact with the ground, whereby it is thrown upwardly, and the upper end thereof will be swung downwardly, carrying with it the rod 25, and through the connections above described the whistle will be sounded, the brakes set, and the steam shut off.

When arranged as hereinbefore indicated, the whole apparatus will work as follows: When the wheel 1 comes onto the counter-rail 15, it revolves and carries with it the feathered shaft 2, which operates the eccentric disks 20 24 at the sides of the locomotive. The rod 19 on one side then causes the whistle 18 to sound, which will not stop until it is shut off by the driver, thus warned of his wrong direction. The rod 25 on the other side by being lowered carries with it the bell-crank lever 26, which draws toward the right hand the second rod 27, above referred to. The latter then causes the link 29 to turn in the same direction, opening the tap or cock 37 to produce the application of the brakes. The second rod 27 also draws a lever 28, which in turn draws to the left a rod 32, thus shutting off the steam-inlet by means of the lever 33, which lifts the valve 34 in the interior of its box 36.

It is important to remark here that as the wheel 1 continues to revolve by friction on the counter-rail 15 the movements resulting therefrom do not interfere with the ordinary working of the whistle 18, the tap 37, operating the brakes, nor the steam-admission valve 34, assuming that the slides have the arrangements hereinbefore enumerated. Finally the endless screw or worm 21 22, which displaces the pointer 23 on its scale, operates during all the time that the wheel 1, running on the counter-rail 15, operates the feathered shaft; but as soon as the wheel 1 quits the counter-rail its gearing acts as a brake and stops the wheel. The result of this is that the pointer 23 will also stop; but in its new position it will form an angle with the zero-line of the graduation of its scale and will thus indicate that the friction-wheel 1 has revolved. Thus an apparatus for checking the working of the automotor apparatus is provided.

The following three results are obtained automatically by the wheel passing over a counter-rail such as described: first, the operation of an alarm-whistle to warn the engine-driver that he is on a wrong track; second, the automatic stoppage of the train by the application of the brakes and the shutting off of the steam; third, a means for checking or recording the working of the actuating device.

It is only necessary then for the guard to block the line in front and behind of his train in the usual manner, while the driver shuts off the whistle 18, pushes by hand the lever 28 again toward the right, and thus returns the tap 37 and the valve 34 to their places, which takes off the brakes and allows the steam to reach the cylinders, thus enabling him to back the engine. The wrong position of the points may then be rectified, if necessary, and the correct direction resumed.

Having now described the working of my arrangement under the action of a counter-rail operating the actuating device, I will explain the method in which these counter-rails must be arranged at the beginning of a branch track or tracks in order to insure a train traveling along the correct line, Fig. 4. For each of the routes a given position for the friction-wheel 1 relatively to the track is adopted—for instance, in a case where there are six lines branching from a single line seventy centimeters from the right-hand rail for route No. 1, sixty centimeters from the right-hand rail for route No. 2, fifty centimeters from the right-hand rail for route No. 3, forty centimeters from the right-hand rail for route No. 4, thirty centimeters from the right-hand rail for route No. 5, and twenty centimeters from the right-hand rail for route No. 6.

A particular route will now be considered—for instance, route No. 4—for which the friction-wheel has been placed at forty centimeters from the right-hand rail by means of the arrangement described for the purpose. Every train following this route will pass first over the switch $a$, and if this switch is wrongly placed the train will deviate from its right route, and it is necessary that its arrangement should operate as soon as the train enters on the wrong direction, and for this reason immediately after the switch-point $a$ there is placed a counter-rail arranged at (in this case) forty centimeters from the right-hand rail. If the switch $a$ is properly set, the train then perhaps reaches another switch, and if the latter is in a wrong position the train will deviate from its right route. In order in this case also to make my apparatus operate, a counter-rail is placed immediately after the second switch *b* and arranged at forty centimeters from the right-hand rail. If the switch is properly set, the train will finally arrive at a third switch *c*, for which it is only necessary to repeat what has been already stated for the second switch.

It is important to notice that as many counter-rails as there are routes for the said trains must be arranged behind each switch. These counter-rails are placed in suitable positions for actuating the friction-wheels on the engines of the trains in question.

In order to avoid errors or irregularities in the working arising from the unauthorized placing of any obstacle on the rail, a track-clearer 43 is preferably suitably fixed in front of the wheel 1.

Having thus described the object of my invention, I claim—

1. In combination in a safety device for trains, a shaft, a wheel adjustable laterally thereon, an alarm-whistle, a brake-controlling valve, a valve controlling the supply of steam, and a series of levers connecting the wheel to the said valves and whistle, said levers being operated by the wheel and means for operating the wheel.

2. In combination in a safety device for trains, a shaft, a wheel secured thereto, a regulating-screw for adjusting the said wheel, an alarm-whistle, a valve controlling the supply of steam, a valve controlling the brakes, a series of levers connecting the wheel to the said valves and whistle, said levers being operated by the wheel for actuating said valves and whistle, means on the track for turning the wheel, and a lever 44 also connected to the series of levers whereby when the train runs off the track said lever will be made to actuate the series of levers to operate the valves and whistle.

3. In combination in a safety device for trains, a shaft, a wheel secured thereto, means for moving the wheel laterally, an alarm-whistle, a valve controlling the supply of steam, a valve controlling the brakes and means actuated by said wheel for operating the said valves and whistle.

In witness whereof I have hereunto set my hand in presence of two witnesses.

JOSEPH AUGROS.

Witnesses:
AUGUSTUS E. INGRAM,
JULES FAYOLLET.